United States Patent [19]
Gallagher, Sr. et al.

[11] Patent Number: 5,912,807
[45] Date of Patent: Jun. 15, 1999

[54] CASE FOR CABLE ASSEMBLIES AND A CIRCUIT BOARD

[75] Inventors: Robert Eugene Gallagher, Sr., Harrisburg; Scott Alan Landis, Elizabethtown; Donald Arthur Cawthra, Dillsburg; Wesley Charles Slagle, Carlisle; David William Gilmore, Newville, all of Pa.

[73] Assignees: The Whitaker Corporation, Wilmington, Del.; Illinois Tool Works Inc., Glenview, Ill.

[21] Appl. No.: 08/906,324

[22] Filed: Aug. 5, 1997

Related U.S. Application Data

[60] Provisional application No. 60/045,022, Apr. 28, 1997.

[51] Int. Cl.$^6$ ....................................................... H05K 7/02
[52] U.S. Cl. .......................... 361/752; 361/772; 361/756; 361/776; 174/92; 174/70 R; 174/71 R; 174/72 A; 174/117 FF; 439/638; 439/701; 439/501; 439/540.1
[58] Field of Search .................................... 361/752, 772, 361/756, 760, 776, 725; 439/214, 215, 501, 540.1, 207, 211, 216, 638, 701; 174/92, 38, 650, 70 R, 71 R, 72 A, 72 C, 112, 117 FF

[56] References Cited

U.S. PATENT DOCUMENTS

| | | | |
|---|---|---|---|
| 3,833,839 | 9/1974 | Debaigt | 317/118 |
| 3,911,328 | 10/1975 | Haury et al. | 317/118 |
| 3,924,916 | 12/1975 | Venaleck | 339/17 LC |
| 3,951,490 | 4/1976 | Devendorf | 339/17 |
| 4,218,724 | 8/1980 | Kaufman | 361/395 |
| 4,603,930 | 8/1986 | Ito | 339/17 R |
| 5,378,166 | 1/1995 | Gallagher, Sr. | 439/214 |
| 5,567,180 | 10/1996 | Seo | 439/638 |
| 5,688,135 | 11/1997 | Gallagher, Sr. | 439/214 |
| 5,754,396 | 5/1998 | Felcman et al. | 361/683 |
| 5,761,033 | 1/1998 | Wilhelm | 361/686 |

*Primary Examiner*—Leo P. Picard
*Assistant Examiner*—David Foster
*Attorney, Agent, or Firm*—Anton P. Ness; Gerald K. Kita

[57] ABSTRACT

Packaging (1) for cable assemblies (2), is constructed with cable assemblies (2) in a case (3), the cable assemblies (2) being routed along an interior of the case (3), a circuit board (4) positioned by the case (3) over the cable assemblies (2), and electrical connectors (5) on ends of selected cable assemblies (2) connect to the circuit board (4).

9 Claims, 5 Drawing Sheets

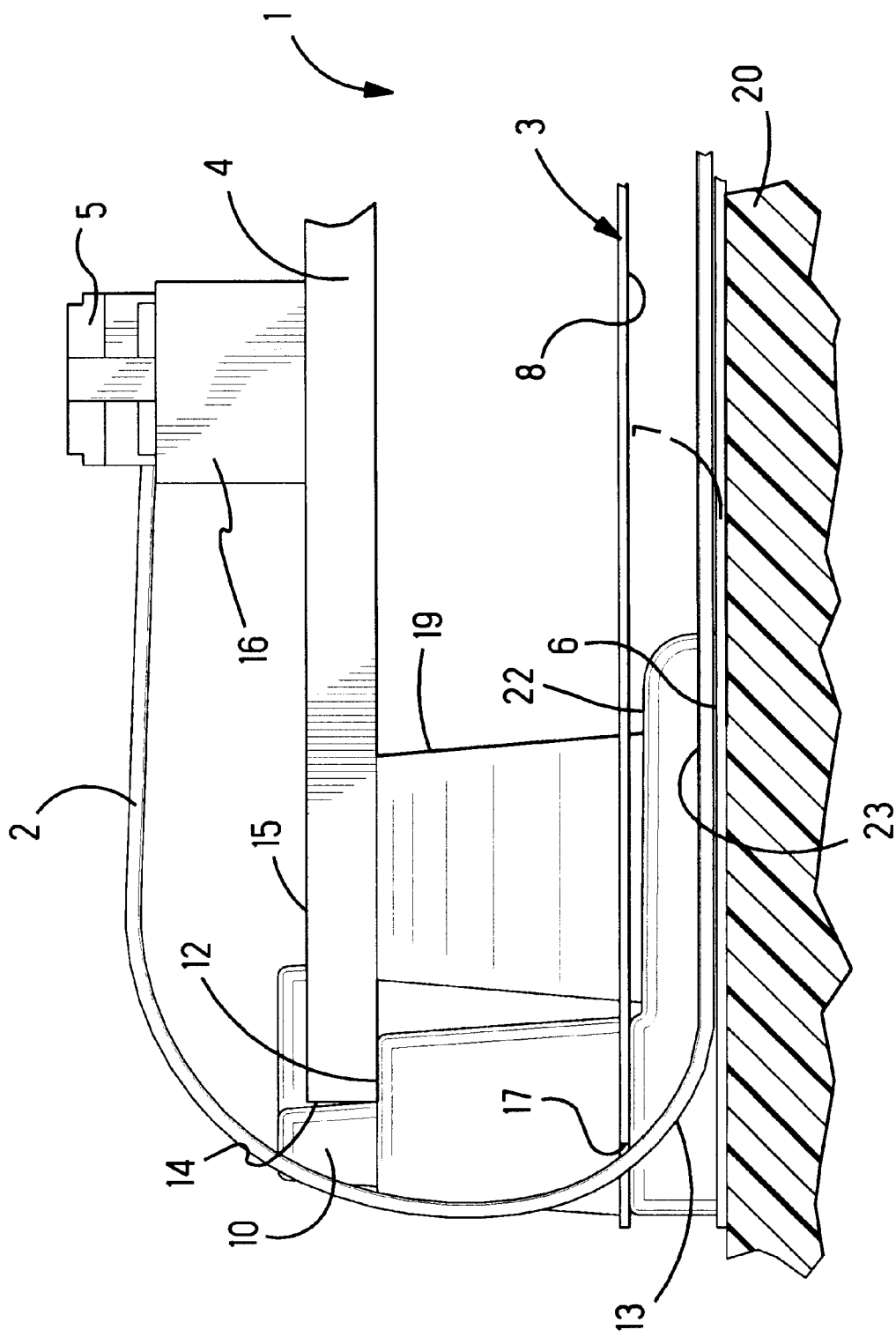

CASE FOR CABLE ASSEMBLIES AND A CIRCUIT BOARD

This application claims the benefit of U.S. Provisional Application No. 60/045,022, filed Apr. 28, 1997.

FIELD OF THE INVENTION

The invention relates to cable organization, and provides a package for organizing cable assemblies and a circuit board to which selected ones of the cable assemblies connect.

BACKGROUND OF THE INVENTION

A case in combination with a cable assembly is known from U.S. Pat. No. 5,378,166, and comprises, a case having a double-backed tape in adhesive contact with an interior cavity of the case, individual cable assemblies in adhesive contact with the tape, and ends of the cable assemblies being terminated with connectors.

SUMMARY OF THE INVENTION

According to the invention, packaging for cable assemblies comprises, cable assemblies routed along an interior of a case, a circuit board positioned in a plane over the cable assemblies, and electrical connectors on ends of selected cable assemblies that connect to the circuit board. The case is designed for ease in manufacture from die cut operation to assembly with cable assemblies and a circuit board.

According to an embodiment, a feature of the packaging resides in a case that holds the circuit board away from the cable assemblies to prevent abrasion.

According to an embodiment, the case provides a package to contain various circuit boards having different circuit paths, and provides a modular package construction that is readily duplicated, for ease of manufacture, to adapt various circuit boards for connection with various cable assemblies in the package.

According to an embodiment, a tray portion of the case routes the cables, a cover portion of the case covers the cables, and the cover portion mounts onto the tray portion.

According to an embodiment, a feature of the packaging resides in a nest fitting area on one side of the case that adapts the case for nesting and stacking, and a nest area on another side of the case adapts the case for nesting and stacking.

According to an embodiment, a feature of the packaging provides for ends of selected cable assemblies to extend through cable exit openings in the case to connect with the circuit board.

According to an embodiment, a feature of the packaging resides in a case that holds the circuit board away from the cables.

According to an embodiment, a case for cable assemblies suspends a circuit board above the cable assemblies, and the cable assemblies are routed to extend from the case and connect to the circuit board.

According to an embodiment, a feature of the packaging resides in a nest fitting portion on one side of the case to adapt the case for nesting and stacking, and corresponding nest portions on another side of the case to adapt the case for nesting and stacking.

According to an embodiment, a feature of the packaging resides in post receiving openings through the case that receive corresponding posts to register against the circuit board.

According to an embodiment, a feature of the packaging resides in a recessed cable receiving channel that provides a route for a selected cable to separate the selected cable from a cross talk sensitive area on the circuit board.

According to an embodiment, a feature of the packaging resides in portions of selected cable assemblies extending through recessed openings in respective edges of the case, and portions of the cable are doubled back for connection to the circuit board.

According to an embodiment, the package provides a bumper that registers against a chassis.

An embodiment of the invention will now be described by way of example with reference to the accompanying drawings, according to which:

DESCRIPTION OF THE DRAWINGS

FIG. 9 is an enlarged fragmentary view of a selected cable assembly connected to the circuit board as shown in FIG. 8.

DETAILED DESCRIPTION

Figure 1:
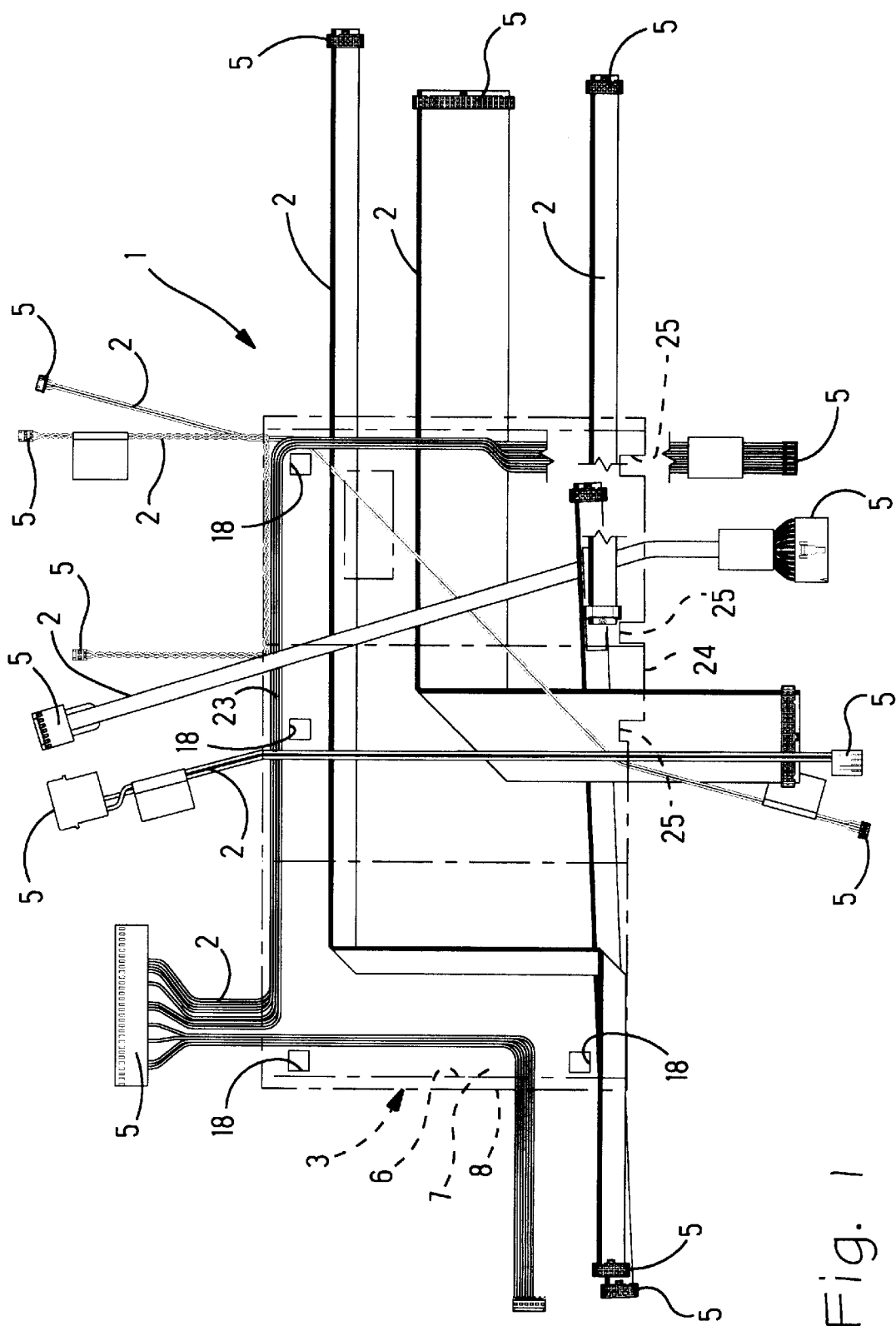
FIG. 1 is a plan view of a case shown in phantom outline and multiple cable assemblies.
Figure 2:
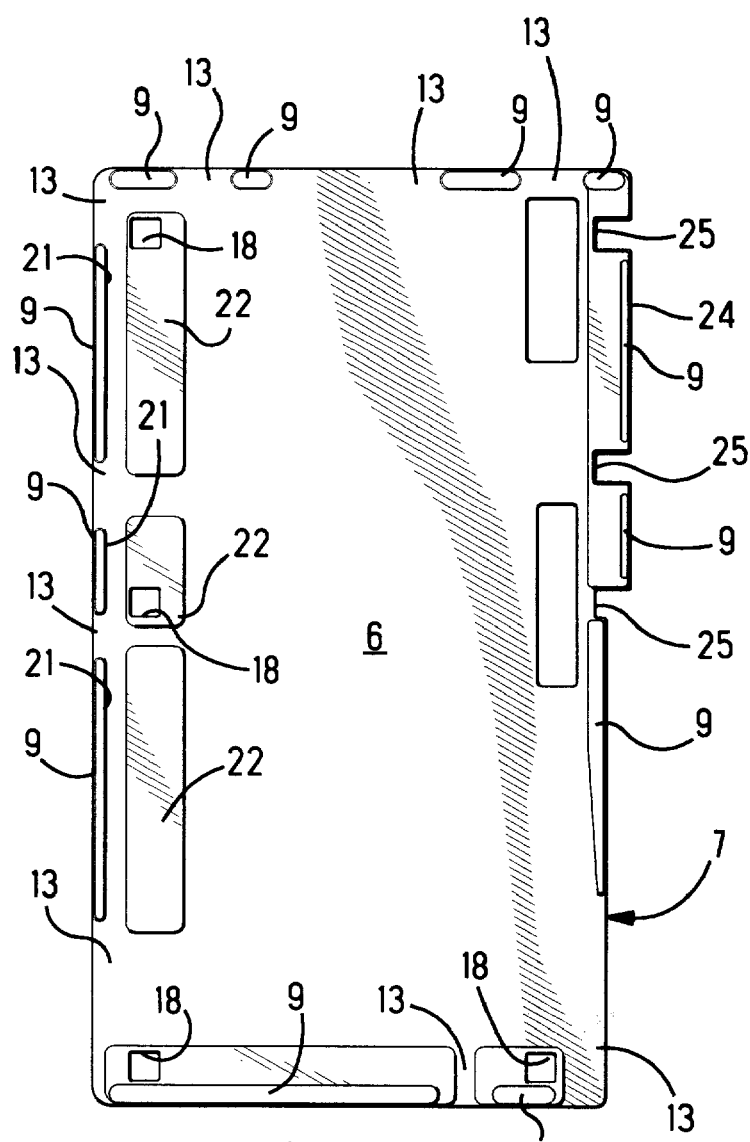
FIG. 2 is a top view of a tray portion of the case as shown in FIG. 1.
Figure 5:
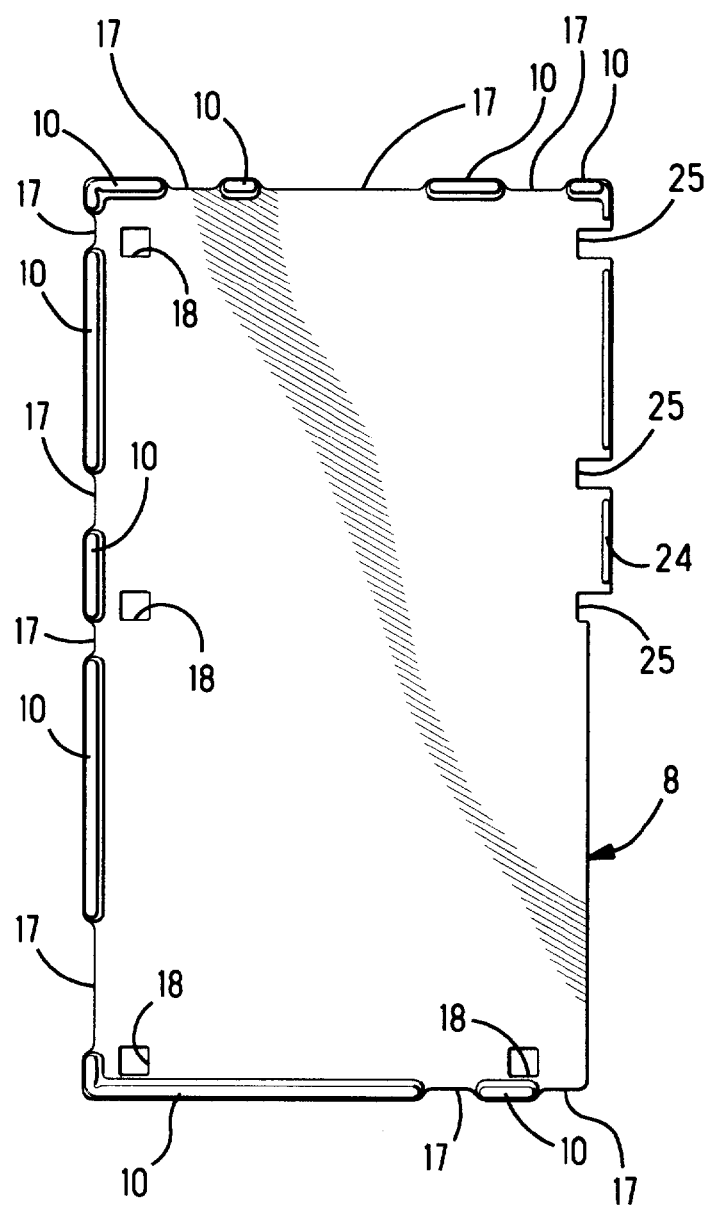
FIG. 5 is a top view of a cover portion of the case as shown in FIG. 1.

With reference to FIGS. 1, 2 and 5, packaging, shown generally at 1, for cable assemblies 2, comprises, the cable assemblies 2 in a case 3, the cable assemblies 2 being routed along an interior of the case 3, a circuit board 4 (FIGS. 8 and 9) positioned in a plane over the cable assemblies 2, and electrical connectors 5 on ends of the cable assemblies 2. Selected connectors 5 on selected cable assemblies 2 connect to the circuit board 4, as shown in FIG. 9. The cable assemblies 2 typically provide a wire harness for interconnection with the circuit board 4. The circuit board 4 is typically mounted inside a chassis of an electrical apparatus, not shown.

The case 3 provides a package 1 to contain a circuit board 4 constructed with various, different circuit paths, not shown, and provides a modular package construction that is readily duplicated, for ease of manufacture, and to adapt various circuit boards 4 with a modular package construction.

The case 3 adapts the various circuit boards 4 for connection with various cable assemblies 2 in the package 1. The circuit board 4 is positioned in a plane over the cable assemblies 2. A feature of the package 1 resides in a case 3 that holds the circuit board 4 away from the cable assemblies 2 to prevent abrasion between the circuit board 4 and the cable assemblies 2.

The case 3 is useful to package multiple cable assemblies 2 that connect with the corresponding circuit board 4. The case 3 provides a package 1 for cable assemblies 2 of various sizes and types, while providing a modular package construction that is readily duplicated, for ease of manufacture, and to adapt various cable assemblies 2 with a modular package construction.

The case 3 provides a package 1 to contain and hold the cable assemblies 2, eliminating cable ties. The case 3 organizes the routes of the cable assemblies 2 for connection to the circuit board 4. The cable assemblies 2 are routed along an interior 6 of the case 3.

Figure 4:
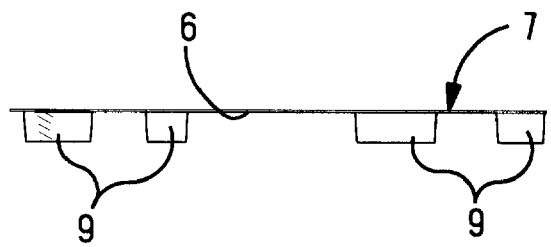
FIG. 4 is an end view of the tray portion as shown in FIG. 2.
Figure 3:
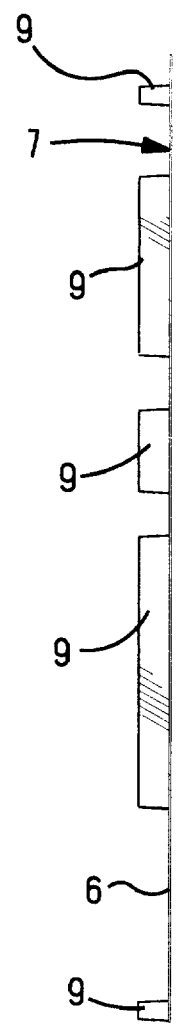
FIG. 3 is a side view of the tray portion as shown in FIG. 2.
Figure 7:
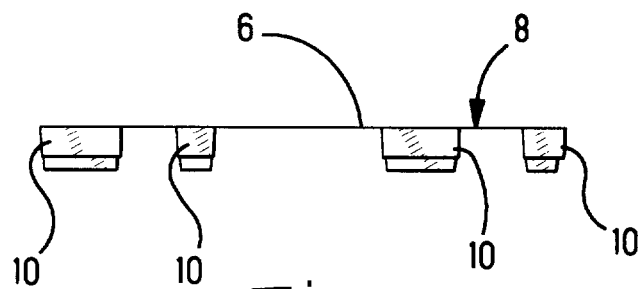
FIG. 7 is an end view of the cover portion as shown in FIG. 5.
Figure 6:
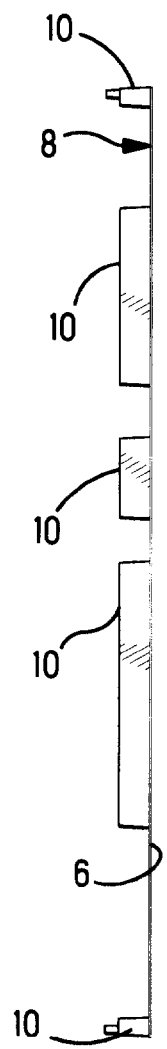
FIG. 6 is a front view of the cover portion as shown in FIG. 5.
Figure 8:
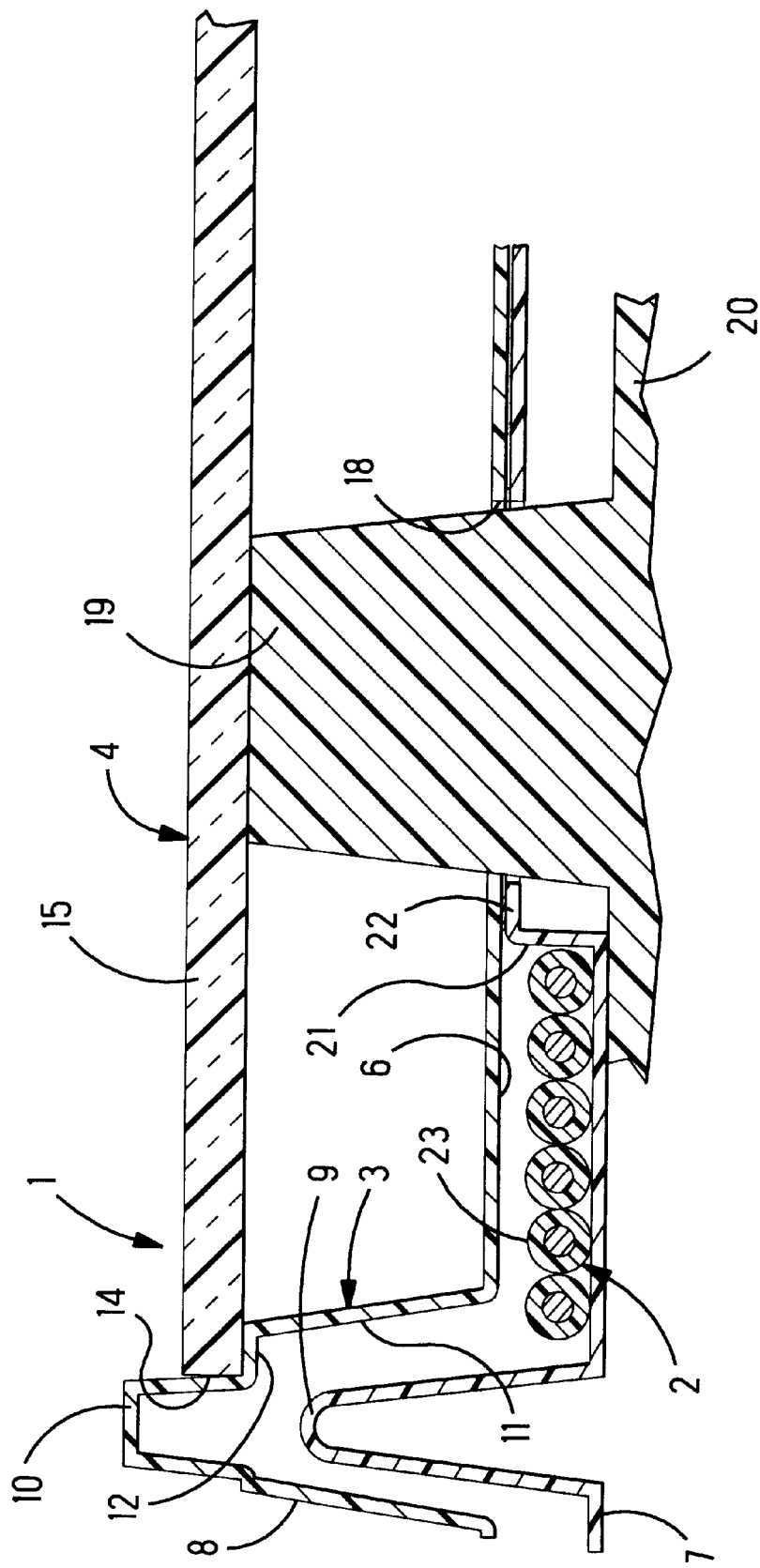
FIG. 8 is an enlarged section view taken through the case of FIG. 1 at a post receiving opening, showing a chassis with a post and also showing a hollow projection of the tray of FIG. 2 within a hollow wall of the cover of FIG. 5, and further showing a portion of a circuit board.

The case 3 is of molded plastic construction, having a unitary tray portion 7, FIGS. 2–4, and a unitary cover portion 8, FIGS. 5–7. The tray portion 7 provides a bottom surface of the interior 6 of the case 3. The tray portion 7 routes the cable assemblies 2 over routes as shown in FIG. 1. The cover portion 8 mounts to the tray portion 7, see FIG. 8, and covers the cable assemblies 2. The interior 6 on the tray portion 7 is encircled by segments of a segmented hollow projection 9. With reference to FIG. 8, the segmented hollow projection 9 provides a nest fitting area that adapts the case 3 to nest and stack. In particular, the tray portion 7 nests with the cover portion 8. The cable assemblies 2 are routed to avoid the segmented projection 9. Further, the cable assemblies 2 project outward and beyond the periphery of the tray portion 7 and the cover portion 8.

With reference to FIGS. 5–7, the cover portion 8 has segments of a segmented hollow wall 10 raised on an exterior of the cover portion 8. The hollow wall 10 is open to the interior 6 of the cover portion 8, providing a nest area that adapts the case 3 to nest and stack. With reference to FIG. 8, a segmented recess 11 in the hollow wall 10 is of a size that nests and fits over the segmented hollow projection 9 of the tray portion 7 to interlock the cover portion 8 and the tray portion 7. An interior space in the interior 6 between the cover portion 8 and the tray portion 7 provides a container for the cable assemblies 2. The cover portion 8 has a ledge 12 that extends laterally beside at least one of the segments of the hollow projection 10. The ledge 12 may extend laterally beside each of the segments of the hollow projection 10. The ledge 12 registers against the segmented hollow wall 9 to limit collapse of the interior 6 of the case 3. Post receiving openings 18 are also provided in cover portion 8 that are aligned with post receiving openings 18 of tray portion 7.

With reference to FIGS. 2 and 5, spaces that separate the segments of the segmented hollow projection 9 of tray portion 7 provide cable exit openings 13 of the case 3. Spaces between the segments of the segmented hollow wall 10 of cover portion 8 also, are aligned with the cable exit openings 13. With reference to FIGS. 1 and 9, end portions of selected cable assemblies 2 extend through the cable exit openings 13 in the case 3 to connect with the circuit board 4.

The electrical connectors 5 on ends of the selected cable assemblies 2 connect to the circuit board 4, FIG. 9. Typically the ends of the selected cable assemblies 2 are doubled back on themselves to overlap the periphery 14 of the circuit board 4, and to extend over a top surface 15 of the circuit board 4. The electrical connectors 5 on the doubled back, selected cable assemblies 2 connect with the circuit board 4, for example, by plugging to respective pin headers, one shown at 16, on the circuit board. The circuit board 4 is suspended in a plane that is spaced from the general upper surface of the cover portion 4. For example, the segmented hollow wall 10 on the exterior of the cover portion is stepped to provide the unitary ledge 12 against which the circuit board 4 registers. The ledge 12 positions the circuit board 4 in a plane that is spaced away from the general upper surface of the cover portion 8.

With reference to FIG. 5, respective edges of the case 3 have recessed openings 17 in the spaces between segments of the wall 10. The openings 17 are in respective edges of the cover portion 8. The recessed openings 17 are between respective segments of the hollow wall 10. Portions of respective, selected cable assemblies 2 are doubled over in the openings 17 to extend to where they plug in, or connect to, the circuit board 4.

The case 3 is designed for ease in manufacture from die cut to assembly with the cable assemblies 2 and the circuit board 4. The case 3 is adapted to contain various circuit boards 4 having different circuit paths, and provides a modular package construction that is readily duplicated, for ease of manufacture, to adapt various circuit boards 4 for connection with various cable assemblies 2 in the package.

With reference to FIGS. 8 and 9, post receiving openings 18 through the case 3 receive corresponding posts 19 that are portions of a chassis 20 of an electrical apparatus. The posts 19, one being shown in FIG. 8, register against a corresponding circuit board 4 to provide a stable mounting of the circuit board to the chassis 20. The post receiving openings 18 register with corresponding posts 19 to prevent movement relative to the posts 19 and the chassis 20.

With reference to FIGS. 2 and 8, at least one cable receiving channel 21 is recessed along a corresponding edge of the tray portion 7. The channel 21 is separated from a remainder of the interior 6 of the tray portion 7 by a raised area 22. The raised area 22 provides a ledge against which the cover portion 8 registers to limit collapse of the case 3. The channel 21 provides a route for a selected portion 23 of a cable assembly 2, FIGS. 1 and 8, that is routed along the channel 21 to isolate the selected cable assembly 2 along a periphery of the package 1, and away from a cross talk sensitive area of the circuit board 4.

With reference to FIG. 1, an edge 24 of the package 1 has a chassis facing recess 25 that provides a clearance for avoiding a projecting portion of the chassis 20 on which the posts 19 are mounted. The recessed edge 24 on the package provides a bumper to register against the chassis 20.

Although a preferred embodiment of the invention has been described, other embodiments and modifications of the invention are intended to be covered by the spirit and scope of the appended claims.

What is claimed is:

1. Packaging for cable assemblies, comprising:

a case having a tray portion and a cover portion mountable thereonto, for holding therein elongate cable assemblies, the cable assemblies being routed along said tray portion, and said cover portion covers the cables held by said tray portion and said cable assemblies routed outwardly of said tray portion through cable exits thereof; and said cover includes projections with a circuit board positioned thereon in a plane over the cable assemblies with electrical connectors on ends of at least one selected cable assembly connected to the circuit board and a portion thereof doubled over to extend atop said cover to avoid the projections and extend to said circuit board.

2. Packaging as recited in claim 1 wherein, a nest fitting area on one side of the case adapts the case to nest and stack, and a nest area on another side of the case adapts the case to nest and stack.

3. Packaging as recited in claim 1 wherein, ends of selected cable assemblies extend through cable exit openings in the case to connect with the circuit board.

4. Packaging as recited in claim 1 wherein, said projections provide nest fitting portions on one side of the case to adapt the case to nest and stack, and corresponding nest portions on another side of the case adapt the case to nest and stack.

5. Packaging as recited in claim 1 wherein, post receiving openings through the case receive corresponding posts to register against the circuit board.

6. Packaging as recited in claim 1 wherein, a recessed cable receiving channel provides a route for a selected cable to separate the selected cable from a cross talk sensitive area on the circuit board.

7. Packaging as recited in claim 2 wherein said nest fitting areas are defined in hollow projections of said tray portion extending upwardly into hollow projections of said cover that also extend upwardly.

8. Packaging as recited in claim 7 wherein said nest fitting areas are located about the periphery of said tray portion and said cover and provide openings therebetween defining exits for said cable portions.

9. Packaging as recited in claim 1 wherein said tray portion and said cover are of molded plastic construction.

* * * * *